United States Patent [19]

Salviati

[11] 4,278,631
[45] Jul. 14, 1981

[54] METHOD AND INSTALLATION FOR PRODUCING BRICKS

[75] Inventor: Antonio Salviati, Vicenza, Italy

[73] Assignee: Salviati Impianti S.p.A., Italy

[21] Appl. No.: 67,375

[22] Filed: Aug. 17, 1979

[30] Foreign Application Priority Data

Sep. 4, 1978 [IT] Italy ................................ 27288 A/78

[51] Int. Cl.³ ........................ F27B 9/12; C04B 33/32
[52] U.S. Cl. ......................................... 264/64; 264/65
[58] Field of Search .............................. 264/64, 56, 65

[56] References Cited

U.S. PATENT DOCUMENTS 2,418,650  4/1947  Mackey ................................. 264/64
3,487,135  12/1969  Hassler ................................. 264/64

Primary Examiner—John Parrish
Attorney, Agent, or Firm—Birch, Stewart, Kolasch and Birch

[57] ABSTRACT

The invention is concerned with the forming, drying and firing steps in brick manufacture. In accordance with the present invention there is a preheating step followed by a hot gas co-current drying. This is carried out in a tunnel with a conveyor.

27 Claims, 9 Drawing Figures

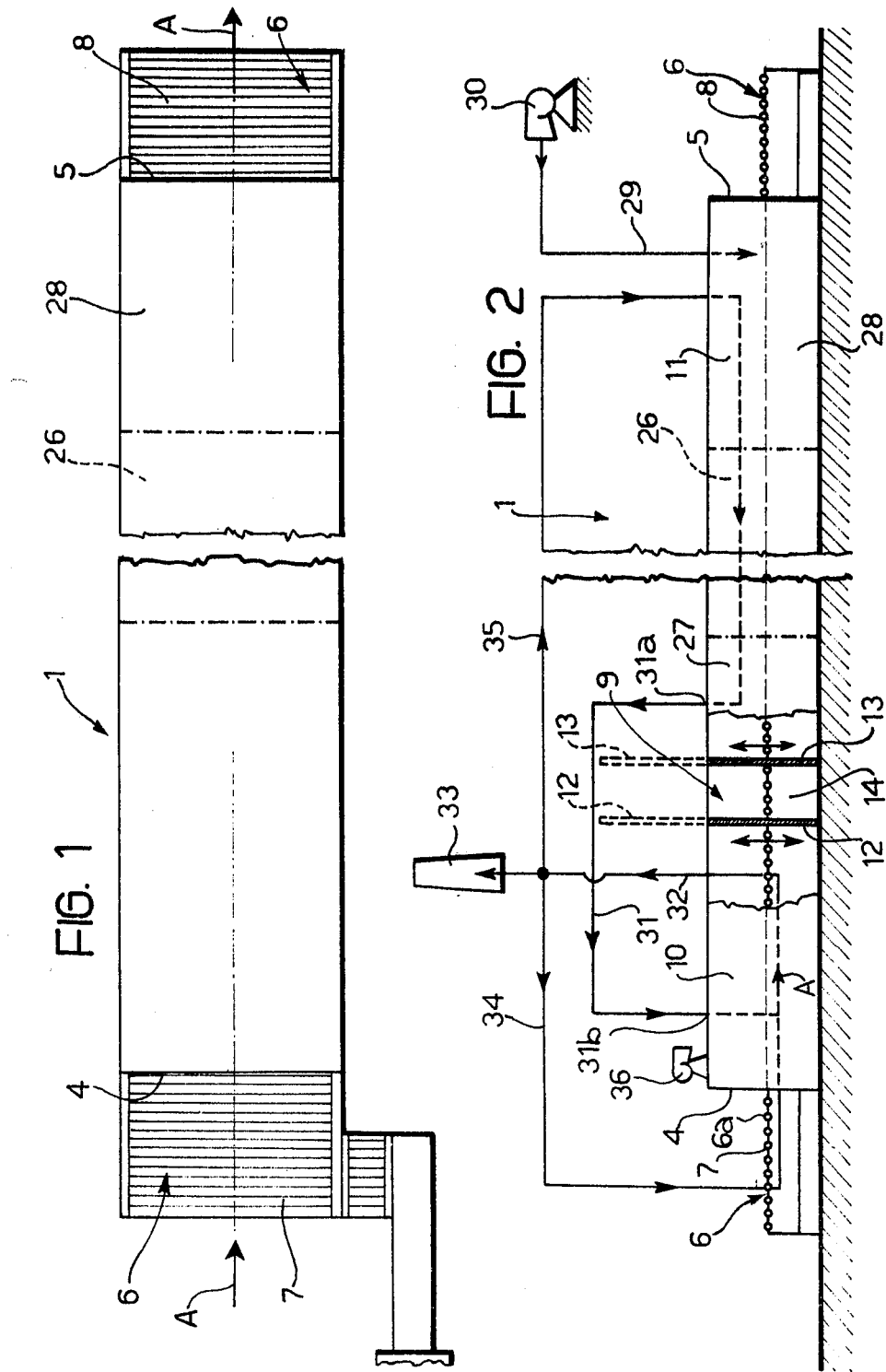

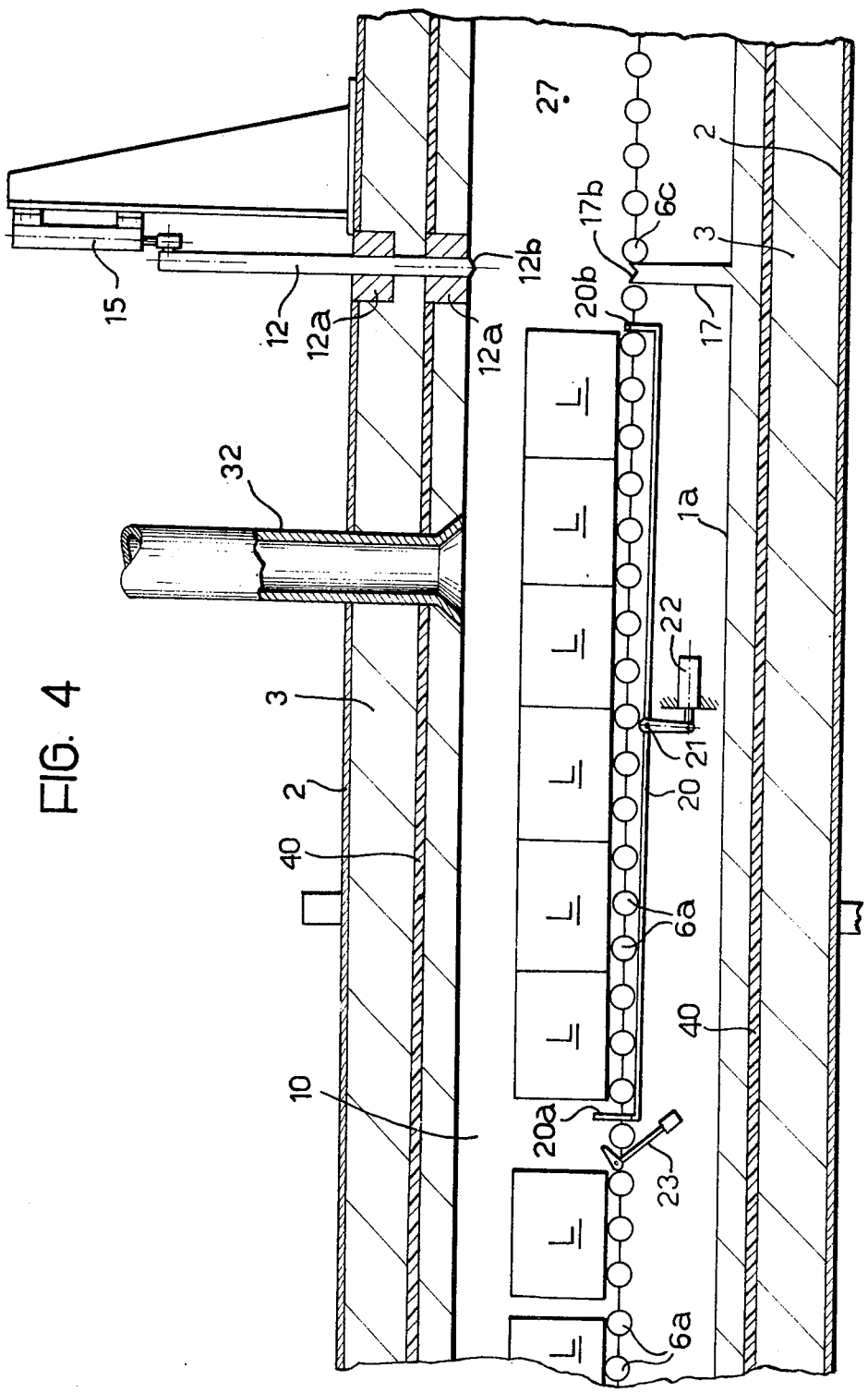

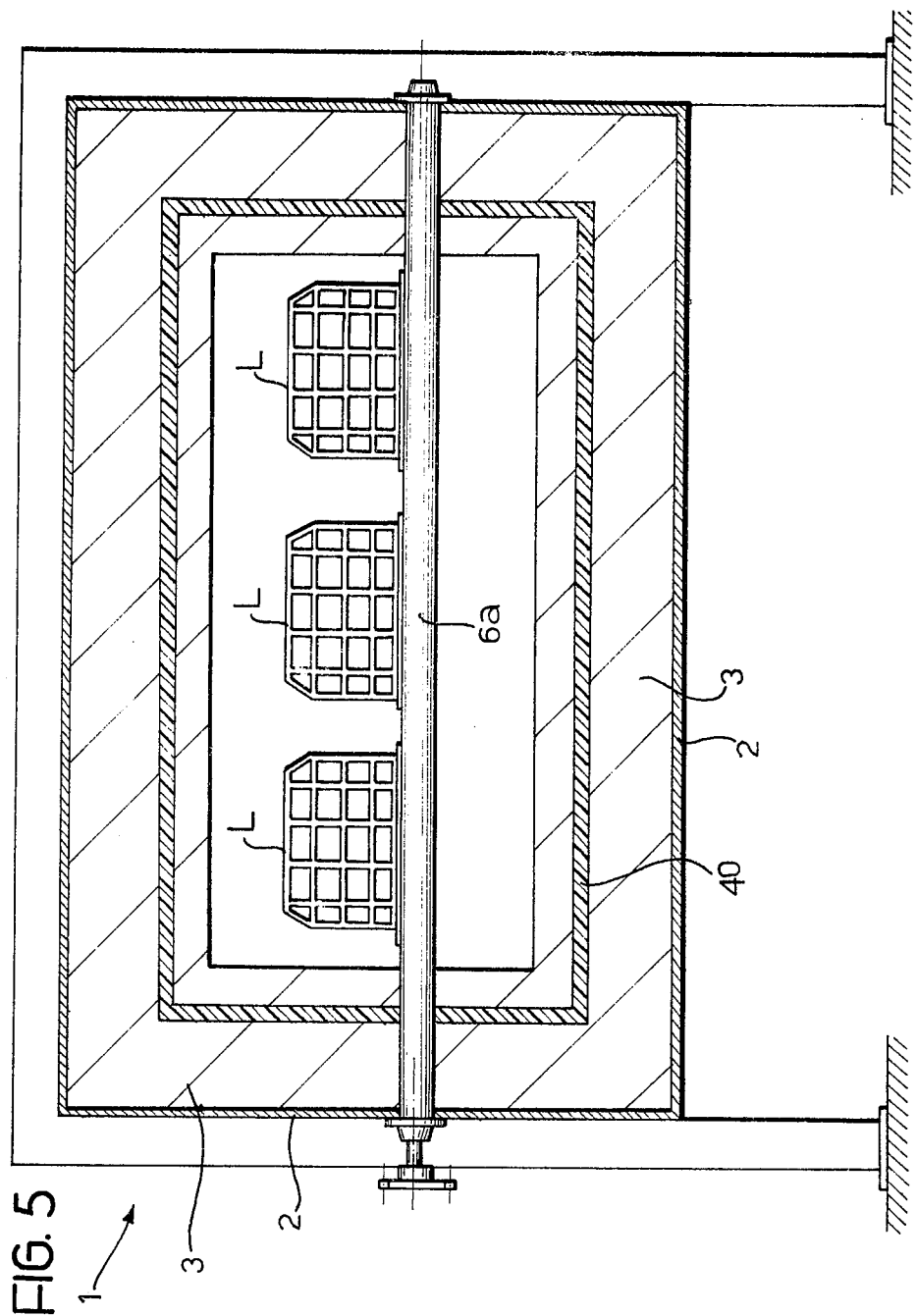

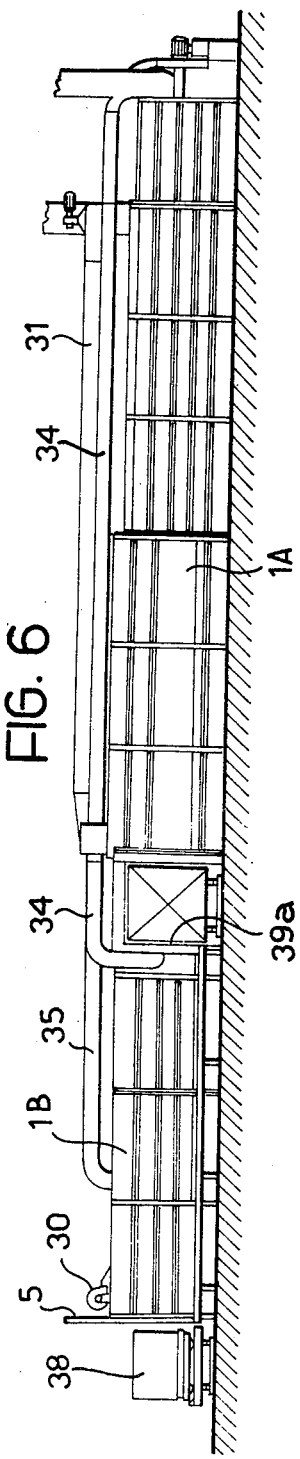
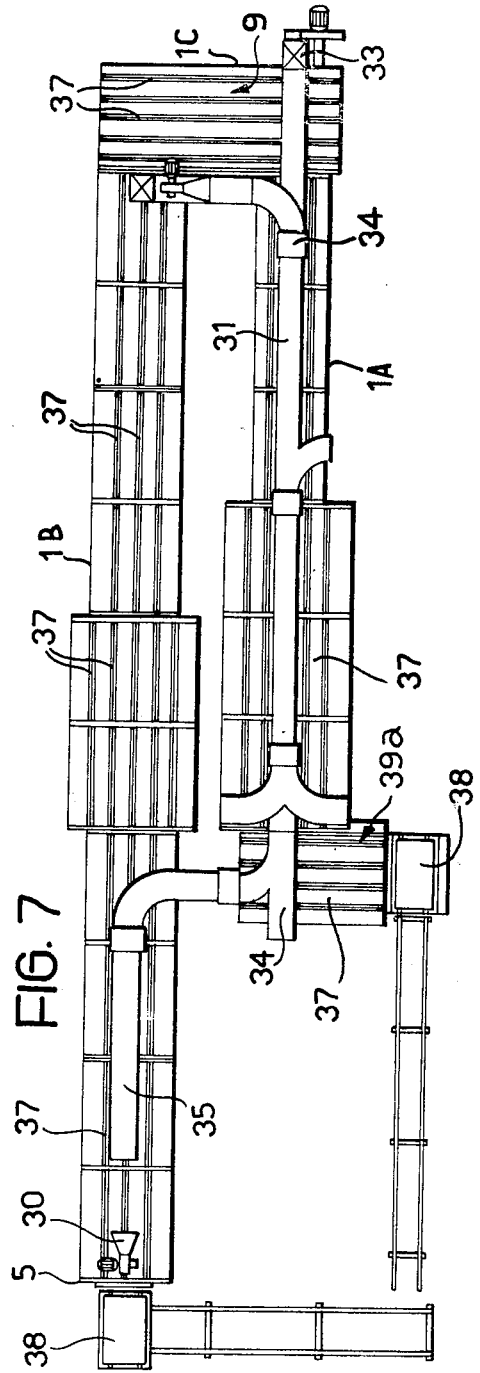

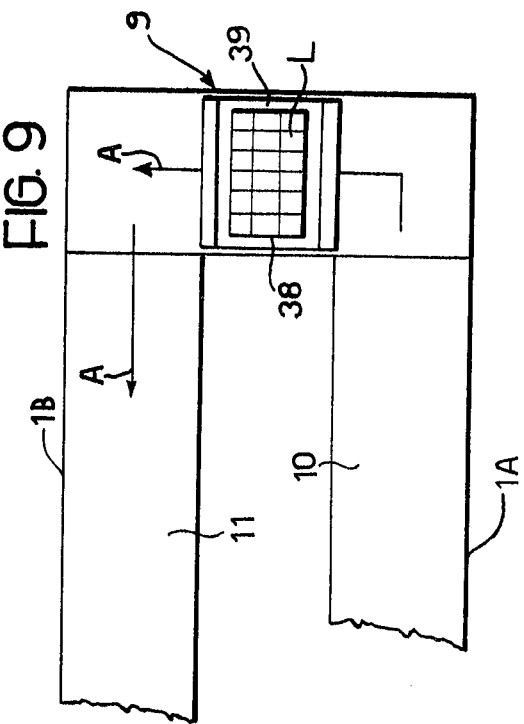
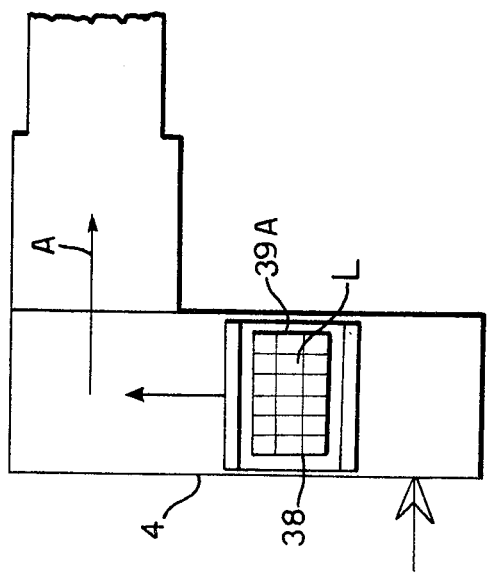

METHOD AND INSTALLATION FOR PRODUCING BRICKS

BACKGROUND TO THE INVENTION

The invention relates to a method for producing bricks in general and an installation formed by the method.

It is known that brick production is based on the following operating steps:
1. Forming green bricks from preprocessed clayey material;
2. Drying the green bricks, and
3. Firing the dried bricks.

It is also known that the aforementioned steps, more particularly the steps of drying and firing, have hitherto been carried out independently of one another in separate environments, using different apparatus in each case, e.g. one or more brick moulding machines or pressers in an environment for moulding the clayey raw material; a dryer, e.g. a tunnel dryer, in an environment for drying green bricks, and a firing furnace, e.g. a tunnel furnace, in an environment for finally firing the dried bricks. The environments and apparatus are "interconnected" by material-conveying systems, with stopping-places if required between one environment and another. For example, one or more stopping-places must be provided between the dryer and the firing furnace in order to manipulate the dried material and send it for firing at a predetermined rate.

The production of bricks, as planned and carried out in the prior art, suffers from serious technical and economic disadvantages, both in the individual operative steps on which it is based, more particularly drying and firing, and with regard to the process as a whole, where the technical disadvantages of the aforementioned individual operating steps combine and aggravate one another.

THE DRYING STEP

The green bricks, after being molded in any suitable manner, must be dried in order to eliminate most of the mixing water and the hygroscopic water therein. This step is necessary in order to give the green bricks sufficient compactness and strength to withstand subsequent handling and loading into the firing furnaces without undergoing deformation, and also to prevent cracking and breaking which would result from excessively rapid elimination of water from the bricks if they were placed in the firing furnaces directly after molding, particularly when the green bricks contain more than 10% moisture immediately after being molded.

In the drying step, it is conventional to use a gallery or tunnel dryer in which drying is brought about by a stream of hot air moving in counter-current with the bricks conveyed through the dryer. In this method, it is known that a large amount of air is required inside the dryer and/or the drying air has to flow at high velocity in order to produce the desired heat-exchange conditions for removing the boundary layer of vapour around the green bricks which are to be dried. Consequently, large amounts of energy are required for driving fans inside or outside the dryer to provide the required volume of air (usually 30 to 80 kg air per kg of evaporated water). This energy consumption is added to the heat losses in the chimney which, as is known, are related to the chimney temperature and the volume of air discharged through it.

In addition to heat exchange between the drying air and the green bricks moving in counter-current, heat exchange occurs through forced convection, the maximum extent of the exchange being dependent on the amount and velocity of air in circulation rather than on the temperature difference between the air and the bricks. In the art in question, the aforementioned temperature difference is always rather low, for the following reasons:
(1) The temperature of the green bricks entering the dryer is relatively low ($\leqq 40°$ C.) and
(2) at the end of the drying process, the bricks can withstand only very small heating since, in this step, water diffuses in the form of vapour into a porous material and the volume of water-vapour is about a thousand times the volume of liquid water. Consequently, the material may burst if the surface heating of the bricks exceeds a predetermined minimum value towards the end of the drying process.

Other technical disadvantages are associated with the fact that the green bricks enter the fire at a relatively low temperature (25°–40° C.) at which the water (in the form of moisture in the bricks) has relatively high viscosity and surface tension so that there is a relatively strong bond between the water and the clay forming the brick. This results in surface drying (and associated surface shrinkage) of green bricks whereas they remain moist inside. The difference between the shrinkage of the outside and the inside results in strong tension in the material and possible permanent deformation or breakage. Another serious disadvantage is that the surface drying is much quicker than inside the green brick, resulting in microcracking of the material, which is often difficult to recognise in the dry material but appears only during the subsequent firing, in the form of a varying but always unacceptable reduction in the strength of the fired material. Furthermore, because of the high velocity of the drying air, when the air flow strikes the sides of the moulded articles perpendicular to the direction of flow, the thermal stress on the aforementioned sides is considerably higher than on the remaining parts of the article, and this results in cracking and deformation on shrinkage.

Another disadvantage is that the load of green bricks must be spaced out in high-speed dryers, in which the heat exchange required for drying is provided by air at high velocity. The result of this requirement is that the available space is not fully used and normally the drying capacity is reduced by half, so that the volumetric efficiency is 50%.

As a result of the aforementioned disadvantages and in view of the productivity normally required in tunnel driers, the driers are given a considerable size. For example, in order to produce 3600 dry bricks per day, a conventional tunnel drier has a total bulk of the order of 6500 m$^3$. These dimensions and and large volumes and-/or velocities of drying air result of course in considerable pressure drops and high consumption of driving energy. Furthermore, as a result of their large dimensions and mass, driers have high thermal impedance which, as is known, means they are slow to respond to any control devices. Another very serious disadvantage is caused by the inevitably large volumes of interfering air, which enter the drier and substantially affect its heat balance.

THE FIRING PROCESS

The firing process which, as is known, is the most important step in brick production, is for eliminating the remaining hygroscopic water and bonding water from the dried articles and irreversibly converting the articles into rigid products (bricks) having properties completely different from the raw material (i.e. the original clay). In most modern processes, firing occurs in tunnel furnaces, which are made up of three portions in which the three main treatment steps occur, i.e. a first portion in which the material is preheated from the temperature at which it enters the furnace to the operating temperature (usually about 800°–1000° C.); a second or firing portion proper in which the brick material is irreversibly transformed in the previously-mentioned manner; and a third portion in which the fired articles are gradually cooled. In a firing furnace of the aforementioned kind, the combustion gases used for pre-heating and the flow of air for cooling the fired articles travel in counter-current to the material, which is loaded on to suitable carriages. This method, more particularly the step of cooling the fired material in a stream of air in counter-current therewith, has a serious disadvantage, which is mainly thermodynamic. Whereas the heat exchange between air and the material to be cooled is satisfactory at temperatures above 400°–500° C., i.e. near the central or firing region, the heat exchange below 400° C. decreases rapidly with temperature. In the prior art, therefore, it is necessary to increase the length of that part of the tunnel furnace in which cooling occurs, so that the material leaving the furnace will be at ambient temperature and ready for storage. This further results in an increase in the time for completing the firing process. The energy consumption for supplying the volumes of air for cooling the fired articles and the considerable heat losses in the chimney are other serious disadvantages, in addition to the considerable amount of interfering air which penetrates all the way along the furnace and, as is known, affects its thermal balance and is one of the most important losses. The bulk and intrinsic dimensions of a tunnel furnace are also disadvantageous. In order, for example, to produce 3600 quintals of fired bricks a day, a conventional tunnel furnace has average total dimensions of the order of 3300 m³. These considerable dimensions result in disadvantages which are well known to the skilled addressee, e.g. the high thermal impedance and the considerable slowness in response to any operations for controlling the process.

In short, in the drying and firing steps in conventional brick producing installations, the main and most serious economic disadvantages are the low thermodynamic efficiency, the high energy consumption required both for the firing step proper and for the flows of hot gas and hot air for drying the green bricks and of cold air for cooling the fired bricks, the considerable bulk and the need to provide intermediate structures between the drier and the firing furnace.

These serious disadvantages of the individual drying and firing steps are more serious in a complete brick producing installation, since the drier in the installation is completely separate from the firing furnace (except for partial recovery of hot air from the cooling region of the furnace), owing to the different thermodynamic requirements, the flow requirements and the different constructional materials used.

The invention is based on the problem of providing a method and associated brick producing installations which have functional and structural characteristics which obviate the aforementioned disadvantages of the prior art.

SUMMARY OF THE INVENTION

To this end, the invention provides a method of producing bricks comprising: a step in which green bricks having a moisture content of at least 13–15% are dried and subsequently fired; step in which the dried bricks are preheated for firing; a step in which the preheated bricks are fired; and a step in which the fired bricks are cooled in a stream of air, or gas driven in counter-current with the bricks the method being characterised in that the drying step and the firing treatment are performed in a single operating unit, having an inlet in which green bricks are supplied in a single layer. The process also comprises the following additional steps.

The green bricks are preheated at the inlet of the unit to a wet-bulb temperature of 45°–100° C., by means of a stream of hot gases having a predetermined moisture content which is driven in co-current with the bricks.

The preheated bricks are dried in a stream of hot gases in co-current with the bricks wherein the stream of hot gases comprises gases coming from the preheating step before firing. The gases coming from the aforementioned drying step are partly recycled to the inlet of the operating unit to form the flow for preheating the green bricks, and partly recycled to the fired-bricks cooling step, where they are mixed with a stream of cold air having a predetermined volume and are partly discharged up the chimney.

Advantageously, in a preferred embodiment, the flow of cold air for cooling the fired bricks is mixed with water until the specific moisture content is at least 100 g/kg of dry air.

The invention also relates to an installation for working the aforementioned method, characterised in that is comprises:

A substantially tunnel unit internally lined with insulating refractory material;

Conveying means for conveying bricks through the tunnel unit in a preferred direction of advance;

At least one diaphragm of material impermeable to the flow of hot operating gases in the tunnel unit, the diaphragm being transversely secured in the unit and dividing it into an upstream portion and a downstream portion relative to the direction of advance of the bricks, the upstream portion being located at the inlet side of the tunnel unit and forming a greenbrick drier and the downstream portion being located at outlet side of the tunnel unit and forming a furnace for firing the dried bricks;

Guide means in the diaphragm for enabling the conveying means to convey the hot operating gases through the diaphragm in sealing-tight manner;

A duct for introducing a stream of cold air into the tunnel near the outlet side of the downstream portions thereof;

A fan for supplying the stream of cold air through the duct in the downstream portion in counter-current with the fired bricks;

A diaphragm by-pass duct extending mainly outside the tunnel unit and having one end communicating with the downstream portion near the diaphragm and the other end communicating with the upstream portion near the inlet side of the tunnel unit, the hot working gases being conveyed through the by-pass duct from the downstream portion and supplied to the upstream portion in co-current with the bricks;

A duct for discharging hot gases, having one end communicating with the upstream portion of the tunnel unit near the diaphragm and the other end communicating with a chimney;

A first duct for recirculating hot gases, having one end communicating with the discharge duct and the other end communicating with the inlet side of the upstream portion of the tunnel unit, the hot gases recirculated by the first recirculation duct being conveyed in co-current with the bricks, and A second recirculation duct having one end communicating with the discharge duct and the other end communicating with the downstream portion of the tunnel unit in a position between the actual firing region and the region in which the flow of cold air is introduced, the gases recirculated by the second gas-recirculating duct being conveyed in the downstream portion of the tunnel unit in counter-current with the bricks.

BRIEF DESCRIPTION OF THE DRAWINGS

Other features and advantages of the invention will be clear from the following description of a method and installation for manufacturing bricks, with reference to the accompanying drawings in which:

FIGS. 1 and 2 are diagrams, in plan and side view respectively, of a unit for working the method according to the invention;

FIGS. 4 and 5 are large-scale views of structural features of the tunnel unit in the preceding drawings.

FIGS. 6 and 7 are diagrams of a variant embodiment, in plan and side view respectively, of a unit for practicing the method according to the invention, and FIGS. 8 and 9 are large-scale diagrams of structural features of the tunnel unit in FIGS. 6 and 7.

DESCRIPTION OF A PREFERRED EMBODIMENT

Figure 3:
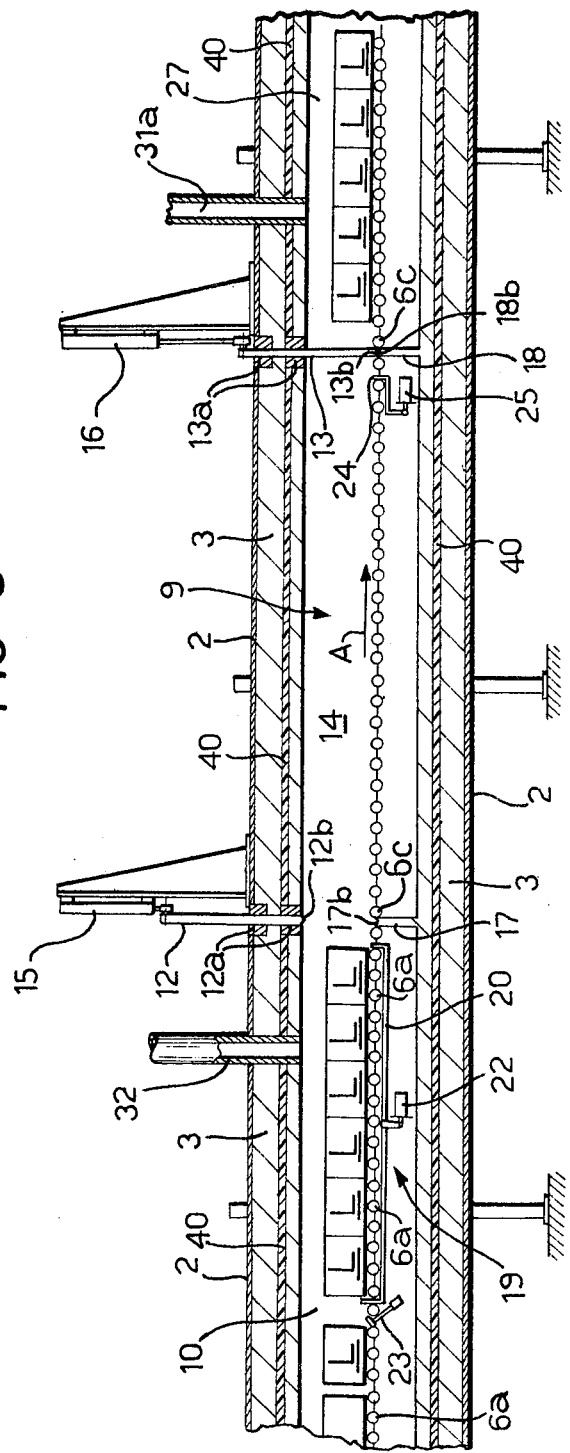
FIG. 3 is a large-scale cross-section of the unit in FIGS. 1 and 2.

With reference to the aforementioned drawings, an installation for practicing the method of making bricks according to the invention basically comprises a tunnel unit 1 mainly comprising an outer metal sheath 2, preferably of steel, and an internal lining 3 of insulating refractory material having a predetermined thickness and characteristics depending on the corrosiveness and temperature of the flows of operating gases adapted to move in the unit, as will be described hereinafter. The tunnel unit has an inlet side 4 and an outlet side 5.

In the preferred embodiment illustrated in FIGS. 1–5, the tunnel unit has a straight longitudinal axis and a conventional roller conveyor 6 extends all the way through it and has motor-driven rollers 6a, the conveyor being designed and dimensioned so as to bear a single layer of bricks and convey them through unit 1.

Arrows A indicate the direction of advance of conveyor 6, i.e. the direction of motion of the bricks through unit 1.

In the rest of the description and the claims, the terms "upstream" and "downstream" will refer to the direction of motion of the bricks.

Conveyor 6 has a portion 7 extending outside the inlet 4 and a portion 8 extending outside the outlet 5. Portion 7 is a loading surface for green bricks to be supplied to the tunnel unit 1, whereas portion 8 is a surface for discharging bricks after they have been fired and cooled, as will be shown in the subsequent description. The general reference 9 in FIGS. 2 and 4 denotes a diaphragm transversely positioned in tunnel unit 1 and dividing it into an upstream portion 10 and a downstream portion 11. Diaphragm 9 is adapted to prevent the flows of operating hot gas travelling inside tunnel unit 1 from the upstream portion 10 to the downstream portion 11 or vice versa, but does not prevent the single layer of bricks from moving on conveyor 6. To this end, in the preferred embodiment, diaphragm 9 comprises a pair of similar walls 12, 13 movable in vertical guides 12a, 12a and 13i a, 13a forming part of the tunnel unit 1, so that the walls can be movably inserted in and taken out of unit 1. Walls 12, 13 are dimensioned so that they can completely shut off the cross-section of tunnel unit 1. They are spaced apart in direction A by a predetermined amount so that when they are both inserted in the tunnel unit they define a chamber 14 for interrupting the flow of hot operating gases, as will be more clearly shown in the description hereinafter.

More particularly (FIGS. 3 and 4) walls 12, 13, which are actuated by hydraulic cylinders 15 and 16 respectively, have horizontal bottom edges 12b, 13b adapted to engage the top edges 17b, 18b of vertical wall 17, 18 respectively so as to seal off the hot operating gas. Walls 17, 18 are secured to base 1a of the tunnel furnace and extend in vertical alignment with walls 12, 13.

The upstream portion 10 of unit 1, which comprises the inlet 4, constitutes a drier in the installation according to the invention whereas the downstream unit 11, which comprises the outlet 5, constitutes the firing furnace in the installation, the drier being structurally separated from the furnace by chamber 14 with regard to the flow of operating gases but not with regard to the movement of bricks. A selector and stop device (general reference 19) is mounted in the upstream portion 10 near wall 12 of diaphragm 9 and mainly comprises a plate 20 balanced around a pivot 21 and extending below a predetermined number of rollers 6a of conveyor 6. Plate 20 has a front raised edge 20a and a back raised edge 20b, the edges being dimensioned so as to be transversely inserted between two successive rollers and thus prevent the advance of the bricks (L) on the conveyor. An axially horizontal double-acting hydraulic cylinder 22 controld the angular motion of plate 20 around pivot 21 so that, as will be shown hereinafter, the front edge 20a and the rear edge 20b are alternately inserted between the conveying rollers. A counter diagrammatically indicated at 23 is disposed immediately upstream the device 19 in the drier portion of unit 1. Reference 24 diagrammatically indicates a stop actuated by a respective hydraulic cylinder 25 so as to be inserted in or taken out from two rollers of conveyor 6, near wall 13 of diaphragm 9. The rollers 6c immediately downstream of walls 12, 13 are motor-driven. In an initial state (FIG. 3), the back wall 13 of diaphragm 9 is inserted completely in tunnel unit 1 whereas the front wall 12 is taken out. Plate 20 is angularly moved into the position in which its rear edge 20b is inserted between two successive rollers whereas its front edge 20a is taken out from the associated rollers. When counter 23 has counted a predetermined number of bricks L moving on conveyor 6, it sends a pulse to cylinder 22 which angularly moves plate 20 so that its front edge 20a is inserted between the corresponding rollers 6a and its rear edge 20b is taken out. At this point, a motor-driven roller 6c begins to rotate downstream of wall 12 so that the bricks are thrown forward after being conveyed as far as the roller, and are stopped by stop 24. After a predetermined time, cylinder 22 reverses the position of plate 20 and hydraulic cylinders 15 simultaneously lowers the front wall 12. When wall 12 has been completely lowered, cylinder 16 moves out or opens the back wall 13 whereas cylinder 25 disengages the stop 24 and simultaneously causes the roller 6c immediately downstream of wall 13 to rotate. After a predetermined time, sufficient for all the bricks to move into the downstream portion 11 of unit 1, the back wall 13 is lowered by cylinder 16 whereas cylinder 15 disengages the front wall 12. At this point, chamber 14 is ready to receive a new "load" of bricks in the previously-described manner. It is clear, therefore, that diaphragm 9 can allow bricks to move in the direction of arrow A but effectively prevents the flow of hot operating gases from moving between upstream portion 10 and downstream portion 11 of the tunnel unit.

The actual firing region for the dried bricks (general reference 26) is formed in the downstream portion 11 (the firing furnace) approximately at its center. Region 26 can be fitted in conventional manner with a number of burners (not shown) or can communicate with combustion chambers outside the tunnel unit and adapted to supply the aforementioned region with gaseous combustion products at a predetermined maximum firing temperature. The region of downstream portion 11 between diaphragm wall 13 and region 26 forms a heating region 27 for preheating the dried bricks before firing, whereas a region 28 for cooling the fired bricks is provided in the downstream portion 11 between the firing region 26 and the outlet end 5. In FIG. 2 reference 29 denotes a duct for introducing cold air into the furnace near outlet 5, whereas reference 30 denotes a fan for conveying cold air through duct 29 to the furnace in counter-current with the bricks to be cooled.

The installation according to the invention also comprises a duct 31 which by-passes diaphragm 9 and extends mainly outside the tunnel unit 1. Duct 31 has an end 31a in communication with the downstream portion 11 of unit 1 near diaphragm wall 13, whereas its outer end 31b is in communication with the upstream portion 10 of unit 1, at a predetermined distance from inlet 4. Reference 32 denotes a discharge duct, one end of which communicates with the upstream portion 10 near wall 12 whereas its other end communicates with a smoke-discharging chimney 33. A first recirculating dict 34 has cne end communicating with the discharge duct 32 and the other end communicating with the upstream portion 10 or drier, near or at the inlet 4. Gases recirculated by duct 34 are conveyed to the upstream portion 10 in co-current with the green bricks.

A second recirculating duct 35 has one end in communication with the discharge duct 32 and the other end communicating with the downstream portion 11 or furnace at a position between the firing region 26 and the cooling air inlet. Gases recirculated by duct 35 are conveyed through the downstream portion 11 in counter-current with the fired bricks and mix with the flow of cold air supplied to downstream portion 11 through duct 29.

Reference 36 denotes a conventional device secured by unit 1 at the inlet 4 of upstream portion 10 (the drier) in order to inject atomized water or vapour into the flow of gas recirculated there through duct 34.

FIGS. 6 to 9 diagrammatically illustrate another embodiment of the tunnel unit 1. In FIGS. 6 and 7, components similar or equivalent to those illustrated in the drawings of the first embodiment are indicated by the same reference number.

In the second embodiment, tunnel unit 1 extends in a substantially U-shape and has parallel arms 1A and 1B connected by a transverse portion 10. The tunnel unit has internal longitudinal guide rails 37 for bearing and guiding a number of slides 38, each bearing a single layer of bricks for drying and firing by the method according to the invention.

A diaphragm 9 is formed in the transverse portion 10 of unit 1 and in the present case comprises a chamber diagrammatically indicated at 39 which axially defines a passage through which the slides 38 loaded with bricks can move in sealing-tight manner, in contact with the walls. In the present embodiment also, diaphragm 9 divides unit 1 into an upstream portion 10 or drier and a downstream portion 11 or furnace. A chamber 39a for interrupting the flow of gas is formed at inlet 4 of the drier portion and is similar to diaphragm 9. Slides 38 can move in sealing-tight manner and in contact with the chamber, but the chamber completely prevents operating gases from coming out of the tunnel or air entering it. A rolling shutter is disposed at the tunnel-unit outlet and, so as to discharge the bricks after firing and cooling. The entire tunnel unit 1 is thus sealed from the flows of operating gas and the outer air.

An important feature of the tunnel unit 1 according to the invention, in both the aforementioned embodiments, is the presence of a tubular member 40 made of Teflon or similar heat-resistant materials, which also withstands acids at high temperature and is flexible and has good mechanical characteristics and a predetermined thickness and is coaxially embedded in the tubular layer of insulating, refractory material 3 which internally lines the tunnel unit 1. More particularly (FIG. 5) the tubular member 40 is positioned at a distance from the internal surface of the refractory lining, the distance being calculated so that, under the operating conditions of the tunnel unit, tubular member 40 is at a temperature above the condensation point of the vapour in the operating gases and/or above the condensation and dissolving point of any corrosive substances (e.g. $SO_3$) in the condensation liquid. In this manner, tubular member 40 constitutes an effective barrier against the formation or penetration of highly corrosive substances dissolved in water (e.g. $H_2SO_4$) which would otherwise rapidly destroy important parts of the refractory insulating lining. The tubular member 40 also prevents interfering air from entering the tunnel unit according to the invention.

The following is a description of an example of the method according to the invention in an installation of the previously-described kind.

THE OPERATING GAS CYCLE

The combustion gases produced or supplied to the firing region 26 in the downstream portion 11 are driven by the stream of cooling air introduced through duct 29 and enter the furnace portion and are sucked by a fan 41 and travel through the furnace portion 27 to diaphragm 9, near which they are taken by the by-pass duct 31 and introduced into the drier portion (the upstream portion 10 of the tunnel unit) and travel through it in the direction A. After coming near diaphragm 9, the gases are taken by the discharge duct 32 and conveyed to Chimney 33. Before reaching chimney 33, a part of the gas discharged from duct 32 is taken from the recirculating duct 24 and introduced into the drier portion 10 at its inlet end 4. When the gases enter the drier, they can be mixed if required with atomized water by the appropriate device 36. After travelling through a first drier portion having a predetermined length, the gases mix with the gases introduced into the drier through bypass duct 31 and together travel towards diaphragm 9. Another portion of the gases discharged from duct 32, before reaching chimney 33, is taken by the recirculation duct 35 and introduced into the furnace portion 11 at a predetermined distance from the place where the cooling air is introduced into the furnace. The aforementioned gases recirculated in the furnace 11 mix with the cooling air and are together conveyed to the firing region 26 and thence to diaphragm 9. The cold air introduced through duct 29 can be mixed if required with a predetermined amount of atomized water.

THE BRICK PRODUCTION CYCLE

The green bricks, after being moulded in conventional manner, are loaded in a single layer on to the flat loading portion 7 of conveyor 6 (or on to a slide 18 stationed near the inlet 4 of the drier portion). The main advantages of the method of drying and firing according to the invention are obtained when the green bricks are made from clay of conventional composition, having a total moisture content (mixing water, hygroscopic water and bonding water) of at least 13–15%. After being disposed in the aforementioned manner, the green bricks are inserted in drier 10 through inlet 4. Inlet 4 is constructed so that the green bricks can move on conveyor 6 or on slides 38 but no hot operating gases can escape and no interfering air can enter. At the inlet, the bricks come in contact with a flow of recirculating gases, with which they travel in co-current through duct 34 and through the first portion of drier. The thermodynamic conditions in the first portion of the drier are such that the flow of recirculating gas preheats the green bricks and also initially dries them. The water evaporated from the bricks increases the moisture content of the flow of recirculating gas. The aforementiond first drier portion (where the green bricks are preheated and initially dried) is preferably at a wet bulb temperature ($t_{bb}$) between 45° and 95°, or still more preferably between 55° and 70° C., whereas the recirculating gases have a dew temperature of at least 40° C. In the aforementioned preheating portion, the gases can become substantially saturated with water extracted from the green bricks.

During their subsequent travel in the drier, the aforementioned preheated green bricks and the flow of recirculating gases meet the flow of hot gases introduced into the drier through the by-pass duct 31 at a temperature of about 400° C., at which they leave furnace 11.

The aforementioned mixture of flows of gas, at a temperature of about 250° C. is used in the step of actually drying the bricks. The bricks and the mixture of gas flows travel in co-current through the last portion of the drier to diaphragm 9, and drying continues until the gases have reached a dew temperature of at least 40° C., whereas the bricks have a remaining moisture content of 2–3%. The flow of gas is taken and conveyed to chimney 33 by the discharge duct 32, whereas the bricks travel through diaphragm 9, which as previously stated, allows them through but prevents any hot operating gas from travelling between the drier and the furnace.

The bricks, at a temperature of about 70°–80° C. travel through chamber 11 (which interrupts the flows of gas) and then enter the furnace portion 11 of tunnel unit 1 or, more specifically, the portion of the furnace where material is preheated.

On entering the furnace, the bricks meet a flow of hot gases (at about 400° C.) coming from the actual firing region 26 and preheating the bricks in counter-current to the maximum operating temperature of 805°–950° C.

After travelling through region 26, the fired bricks are initially cooled by a gas mixture comprising the gases discharged from the drier and recirculated by duct 35 and cold air introduced into the furnace 11 by duct 29. When the gases discharged by the drier are introduced into the furnace portion, they have the same moisture content and the same temperature as the gases going to chimney 33. The cold air introduced into the drier may advantageously be mixed with atomized water, depending on the thermodynamic requirements of the drying and firing cycle according to the invention. It has been found, for example, that the heat exchange between the fired bricks and the flow of cooling gas had optimum heat-exchange coefficients when the specific moisture content of the cold air introduced into the furnace portion was at least 100 g water per kg dry air.

When the bricks, during the cooling process, have travelled beyond the place where the gases discharged from the drier are introduced, they meet a cooling flow in counter-current, i.e. cold air mixed with water if required, and are additionally cooled so that when the bricks leave the tunnel unit 1 they have been fired, cooled and are ready to be stored.

The following table shows the temperature and moisture content of the bricks and hot operating gases during the performance of the method according to the invention in a pilot operating unit of the kind described hereinbefore. The speeds of the operating gas flows in the aforementioned tunnel unit were 1.8 m/s and the installation was designed to produce 600 kg of fired bricks per hour.

TABLE

| POSITION in the tunnel unit according to the invention | BRICKS | | HOT OPERATING GASES | | |
|---|---|---|---|---|---|
| | Temperature | Moisture Content | Temperature | Moisture Content g/kg dry air | Temperature (Wet bubl, $t_{bb}$) |
| Inlet side (4) | 25° C. | 25% | 120° C. | 148 | 63° C. |
| At end of preheating in drier | 62° C. | 22% | 90° C. | 156 | 62° C. |
| Beginning of drying | 62° C. | 22% | 240° C. | 100 | 64° C. |
| End of drying | 70° C. | 3% | 120° C. | 148 | 63° C. |
| Entry into the preheating region of the furnace (27) | 70° C. | 3% | 400° C. | 50 | 66° C. |
| Firing region (26) | 900° C. | — | 920° C. | 50 | 80° C. |
| Cooling after introduction | | | | | |

TABLE-continued

| POSITION in the tunnel unit according to the invention | BRICKS Temperature | BRICKS Moisture Content | HOT OPERATING GASES Temperature | HOT OPERATING GASES Moisture Content g/kg dry air | HOT OPERATING GASES Temperature (Wet bubl, $t_{bb}$) |
|---|---|---|---|---|---|
| of the recirculating gas (35 in 28) | 180° C. | — | 120° C. | 20 | 42° C. |
| Outlet (5) | 100° C. | — | 20° C. | 5 | 12° C. |

Discharge up the chimney (furnace + drier) = 1350 kg of gas per hour, equivalent to 7 kg of air per kg of evaporated water.

The main advantages of the invention, with reference to the aforementioned method, are as follows:

THE DRYING STEP

The green bricks are preheated in a stream of hot gases recirculated to the inlet 4 of the tunnel unit, the gases having a temperature of about 100° C. and a moisture content near saturation and, if required, being mixed with atomized water. The bricks, beside being initially dried, are brought to the following state:

A considerable reduction in the strength of the water-clay bond,

A reduction in viscosity and surface tension of the water;

An increase and equalization of the diffusivity of water in the bricks.

Subsequently, during the actual drying process, which is brought about in co-current by the mixture of aforementioned gases with the gases in the upstream portion 10 from the by-pass duct 31, the bricks shrink uniformly and there is a considerable reduction in the internal tension in each article and a consequent considerable reduction in the risk of deformation, microcracking, breaking or the like. In addition, the heat exchange between the bricks and the flow of hot, moist gas in co-current is mainly due to the temperature difference between the bricks and the gas flow, instead of heat exchange by forced convection as in the prior art. The temperature difference, and consequently the heat exchange, can be adequately increased, particularly at the beginning of drying, since when the bricks are in the previously-described state they can withstand greater surface heating than the very small amount allowed by the prior art drying processes, without any risk of bursting as a result of the spread of vapour inside each article. This is because the water flows in liquid form at the surface of the article, where it immediately evaporates owing to the high temperature and the high moisture content of the drying gases. The heat exchange is also greatly improved by the presence of water in the flow of drying gases and by the presence of carbon dioxide. As a result of these improved heat-exchange conditions and the fact that the bricks can be subjected to greater surface heating at the beginning of drying, the drying step in the method according to the invention can be completed in a much shorter time and consequently the drying portion of the installation can have greatly reduced total dimensions. In the case for example where 3600 quintals of fired bricks are produced per day, it has been found that the total bulk of the drying portion of the operating unit for performing the method according to the invention is about 400 m³ compared with 6500 m³ hitherto required in prior art driers.

Another important advantage is the low velocity and small volume required for the flow of operating gases in the drying step, thus greatly reducing the energy consumption compared with the prior art.

THE FIRING TREATMENT

The main advantage of this treatment is that the fired bricks are cooled under heat-exchange conditions which are considerably better than those in the prior art, owing to the presence of water in the cooling gas flow. As is known, the water inproves the thermal conductivity at high temperatures (above 350°-400° C.) and even at lower temperatures (below 300°-350° C.) the heat-exchange coefficients are decidedly superior to those e.g. of air alone, as used for cooling in the prior-art firing processes. The direct consequence of this improvement in heat exchange is that the time for cooling the fired bricks is substantially reduced, with a consequent considerable reduction in the total length of the furnace, more particularly the length of the part required for the cooling step. Another advantage is that the flow of cooling gas, which has a high moisture content, is conveyed in counter-current with the bricks during the entire firing process, thus greatly improving the thermodynamic conditions of the process in both the preheating step and the actual firing step. The immediate consequence of these improved conditions is that the bulk of the firing furnace (the downstream portion 11 of the firing unit) can be greatly reduced compared with that required in prior art firing furnaces. In the previous example of a production of 3600 quintals of fired bricks per day, the total bulk of the furnace portion in the firing unit according to the invention is about 830 m³ compared with the 3250 m³ required by a prior art furnace. The average energy consumption in the method according to the invention is one-third of the consumption in the drying step and the independent firing step in the prior art. The fuel consumption is also reduced by 30-50% relative to the prior art. In the case of the installation according to the invention, basically comprising the aforementioned operating unit, the main advantages compared with the prior art, for a given daily production of fired bricks, are:

(1) greatly reduced bulk, greater economy and speed of operation and preparation, and quicker response to any alternations in the characteristics of the process;

(2) complete elimination of the need to station and park slides in readiness or the auxiliary services hitherto required between the drier and the furnace. More particularly, there is no need for the apparatus for separating the dried bricks and piling the dried bricks together again at the furnace inlet. As is known, this apparatus is very expensive to produce and operate and requires operators. There is a considerable simplification in the operations of packing the fired bricks.

(3) There is surprising sealing-tightness against the entry of interfering air. Prolonged tests on the amount of oxygen present in the gases discharged from the chimney have shown that only a negligible amount of interfering air enters during the operation of the unit according to the invention. The resulting advantage is a considerable reduction in heat losses up the chimney and ease in checking the thermal balance of the entire drying and firing process. This advantage, the importance of which is admitted by all those skilled in the art, is based on the fact that the operating unit according to the invention comprises a metal sheath internally lined with insulating refractory material and a tubular Teflon member is enclosed in the thickness of the lining.

(4) An operating unit can be constructed from a number of modular portions and consequently the unit can be prefabricated, with all the attendant advantages.

What is claimed is:

1. A method for producing bricks in a brick producing apparatus wherein said bricks are dried and fired in a single operating unit and wherein said bricks are transported through said unit, comprising the steps of:
preheating green bricks having a total moisture content of 13–15% to a wet-bulb temperature of 45°–100° C. in a co-current stream of hot gases having a predetermined moisture content;
drying said preheated bricks in a co-current stream of hot gases;
heating said dried bricks in preparation for firing;
firing said heated bricks; and
cooling said bricks, at least a portion of the gases from said heating step being utilized in drying said green bricks and at least a portion of the gases from said drying step being utilized in said preheating and said cooling steps, respectively.

2. A method according to claim 1, wherein said bricks are cooled in a stream of cold air and gas driven in counter-current with said bricks.

3. A method according to claim 2, wherein said bricks are fired and cooled in the same stream of air and gas driven in counter-current with said bricks.

4. A method according to claim 3, wherein the drying step is continued until the drying gases have a dew temperature of at least 40° C.

5. A method according to claim 3, wherein the gases for preheating said bricks have a predetermined temperature and moisture content and thereby simultaneously bring about initial drying of the bricks.

6. A method according to claim 5, wherein said cold air is mixed with a predetermined quantity of atomized water.

7. A method according to claim 6, wherein said atomized water is added in a quantity sufficient to bring the moisture content of the air to at least 100 g of water per kg of dry air.

8. A method according to claim 5, wherein said preheating and drying of said bricks is effected by the same co-current stream of gases.

9. A method according to claim 8, wherein said co-current and said counter-current streams of gases, respectively, are physically separated.

10. A method for producing bricks in a brick producing apparatus wherein said bricks are dried and fired in a single operating unit and wherein said bricks are transported through said unit, comprising the steps of:
preheating green bricks having a total moisture content of 13–15% to a wet-bulb temperature of 45°–100° C. in a co-current stream of hot gases having a predetermined moisture content;
drying said preheated bricks in a co-current stream of hot gases which includes hot gases from said preheating step;
heating and subsequently firing said dried bricks in a counter-current stream of gases which is separated from said co-current stream of hot gases; and
cooling said bricks.

11. A method according to claim 10, wherein gases from said heating region are utilized in drying said preheated bricks.

12. A method according to claim 11, wherein part of the gases from said drying step are utilized to form the flow for preheating the green bricks.

13. A method according to claim 12, wherein part of the gases from said drying step are utilized in said cooling step.

14. A method according to claim 13, wherein part of the gases from said drying step are mixed with a stream of cold air having a predetermined volume and part of said gases from said drying step are discharged from the apparatus.

15. A method according to claim 14, wherein said operating unit includes an inlet and an outlet and said bricks are transported from said inlet, through said unit and out of said outlet.

16. A method according to claim 15, and further including sealing said inlet and outlet, respectively to separate the operating gases from the outer air.

17. A method according to claim 14, wherein the drying step is continued until the drying gases have a dew temperature of at least 40° C.

18. A method according to claim 17, wherein the gases for preheating said bricks have a predetermined temperature and moisture content and thereby simultaneously bring about initial drying of the bricks.

19. A method according to claim 18, wherein said cold air is mixed with a predetermined quantity of atomized water.

20. A method according to claim 19, wherein said atomized water is added in a quantity sufficient to bring the moisture content of the air to at least 100 g of water per kg of dry air.

21. A method according to claim 19, and further including the step of controlling the moisture of the gases in said drying step by mixing said gases with atomized water.

22. A method according to claim 14, wherein said bricks are preheated at a wet-bulb temperature between 45°–95° C.

23. A method according to claim 22, wherein said bricks are preheated at a wet-bulb temperature between 55°–70° C.

24. A method according to claim 23, wherein said bricks are dried to a moisture content of 2–3% before firing.

25. A method according to claim 15, wherein said bricks are dried and fired in a single layer.

26. A method according to claim 14, wherein the gases from said drying step are substantially saturated with water.

27. A method according to claim 8, wherein part of the gases from said drying step are discharged from said operating unit.

* * * * *